(12) United States Patent
Szacsvay

(10) Patent No.: US 6,877,287 B2
(45) Date of Patent: Apr. 12, 2005

(54) DEVICE WITH FLAT, PANEL-SHAPED COMPONENTS

(75) Inventor: Tamás Szacsvay, Bern (CH)

(73) Assignee: Swiss Sustainable Systems AG, Bern (CH)

( * ) Notice: Subject to any disclaimer, the term of this patent is extended or adjusted under 35 U.S.C. 154(b) by 41 days.

(21) Appl. No.: 10/435,646

(22) Filed: May 9, 2003

(65) Prior Publication Data

US 2003/0213201 A1 Nov. 20, 2003

(30) Foreign Application Priority Data

May 16, 2002 (EP) ............................................. 02405398

(51) Int. Cl.⁷ .............................................. E04D 13/04
(52) U.S. Cl. ......................... 52/302.1; 52/551; 52/533; 52/14
(58) Field of Search ........................ 52/533, 551, 518, 52/13, 14, 15, 173.3, 302.1

(56) References Cited

U.S. PATENT DOCUMENTS

| | | | | |
|---|---|---|---|---|
| 3,077,056 A | * | 2/1963 | Albee, Jr. .................. | 52/238.1 |
| 3,264,790 A | * | 8/1966 | Beals ............................ | 52/14 |
| 3,760,856 A | * | 9/1973 | Kough et al. ............... | 144/345 |
| 4,473,973 A | * | 10/1984 | Lane .............................. | 52/13 |
| 4,528,784 A | * | 7/1985 | Simpson et al. .............. | 52/14 |
| 5,029,425 A | * | 7/1991 | Bogataj ....................... | 52/482 |
| 5,571,338 A | | 11/1996 | Kadonome et al. | |
| 5,623,787 A | * | 4/1997 | Ali ............................... | 52/13 |
| 5,642,596 A | | 7/1997 | Waddington | |
| 6,044,609 A | * | 4/2000 | Kim ............................. | 52/551 |
| 6,223,492 B1 | * | 5/2001 | Barnhart et al. .............. | 52/551 |

FOREIGN PATENT DOCUMENTS

| | | |
|---|---|---|
| DE | 299 12 699 U1 | 1/2000 |
| EP | 0710750 A2 | 5/1996 |
| EP | 0960990 A2 | 4/1999 |
| JP | 10-280629 | 10/1998 |
| NL | 1002425 | 8/1997 |
| WO | WO 97/37091 | 10/1997 |
| WO | WO 01/54205 A1 | 7/2001 |

* cited by examiner

*Primary Examiner*—Brian Glessner
(74) *Attorney, Agent, or Firm*—Collard & Roe, P.C.

(57) ABSTRACT

Adjacent rows of flat, panel-shaped components disposed below one another, overlapping in a shingle-like way, form a covering of a roof or a facade. The components are preferably designed as photovoltaic elements. Disposed under the components in each case in the region between adjacently situated vertical rows is a section forming an upwardly open channel in order to receive and drain water running off next to the components. The section has sawtooth-shaped lateral parts on which the components are borne in their shingle-like configuration. By means of the lateral parts, a clearly defined support for the components is formed, and by means of the sections draining the water, seals between the components can be dispensed with even in horizontal direction.

9 Claims, 1 Drawing Sheet

DEVICE WITH FLAT, PANEL-SHAPED COMPONENTS

CROSS-REFERENCE TO RELATED APPLICATIONS

Applicant claims priority under 35 U.S.C. § 119 of European Patent Application No. 02405398.5 filed May 16, 2002.

BACKGROUND OF THE INVENTION

1. Field of the Invention

The invention relates to a device with flat, panel-shaped components, in particular for covering sloping roofs or facades, in which rows of components are fixed, disposed under one another, overlapping in a shingle-like way.

2. The Prior Art

Known tiles have lateral, downwardly projecting noses, and form with the adjacent tile a channel for draining rainwater or water from melting snow. If roofs or facades are supposed to be covered with flat, panel-shaped components instead of with tiles, these elements must overlap such that water cannot flow between the components. If the components contain photovoltaic elements, surface is lost through this overlapping which is not exposed to the sun. If, moreover, the components lie on top of one another in their overlapping regions, there is a risk of damage to the photovoltaic elements, and the replacement of the components is made more difficult or made impossible.

The international patent application WO 97/37091 shows a bearing element for fixing a panel-shaped component to a sloping roof. The bearing element has spacers which allow panel-shaped components to be kept in shingle-like configuration. Nevertheless there are no indications in this document as to how water is drained from a roof constructed in this way. The international patent application WO 01/54205 also concerns the configuration of panel-shaped components on a roof, and proposed is to seal off the places between the adjacent components. Also in the international patent application EP 0 710 750, sealing measures are described for panel-shaped elements.

With this state of the art as a point of departure, the invention has the object of proposing a device with flat, panel-shaped components which has an especially simple design consisting of only few elements, and with which no sealing measures are necessary between the components.

SUMMARY OF THE INVENTION

This object is achieved according to the invention in that disposed under the components in each case in the region between adjacently situated rows of components is a section forming an upwardly open channel in order to receive and drain water running off next to the components, and in that the section has sawtooth-shaped lateral parts on which the components are borne in their shingle-like configuration.

This solution according to the invention has the advantage that a clearly defined support is formed for the components by means of the lateral parts, and that seals between the components can be dispensed with, by means of the water-draining sections.

According to a special embodiment of the invention, the section has a crosspiece, preferably in the middle, projecting upward from the section floor. By means of this crosspiece, on the one hand, the section becomes firmer, and, on the other hand, the crosspiece prevents adjacent components from touching. The sawtooth-shaped lateral parts can be received in longitudinal grooves provided in the section, and are made preferably of plastic. Alternatively, the longitudinal grooves can also be provided in the lateral parts. This makes it possible to keep larger quantities of sections in stock, and to furnish them with lateral parts depending upon the thickness of the components, in which parts the height of the "teeth" are adapted to this thickness. The section is thereby preferably made of fiberglass-reinforced plastic, and is produced through pultrusion. The section can also be made of sheet metal, however, and can be produced through bending. It is thereby possible to produce the section and its lateral parts in one piece.

According to a special embodiment of the invention, the sections are borne on supports running at least approximately orthogonally to them, for example on common roof battens, and hooks are provided which are fixed with one end to one of the supports and with the other end encompass the lower edge of a component. The encompassing part of the hook prevents a direct touching of components lying shingle-like on top of one another.

According to an especially preferred embodiment of the invention, at least part of the components are designed as photovoltaic elements or contain such elements. In a solar roof or solar facade so created, the mentioned advantages of the invention take on additional significance.

BRIEF DESCRIPTION OF THE DRAWINGS

A special embodiment of the invention will be described more closely in the following, by way of example, with reference to the attached drawing.

DETAILED DESCRIPTION OF PREFERRED EMBODIMENTS

Figure 1:
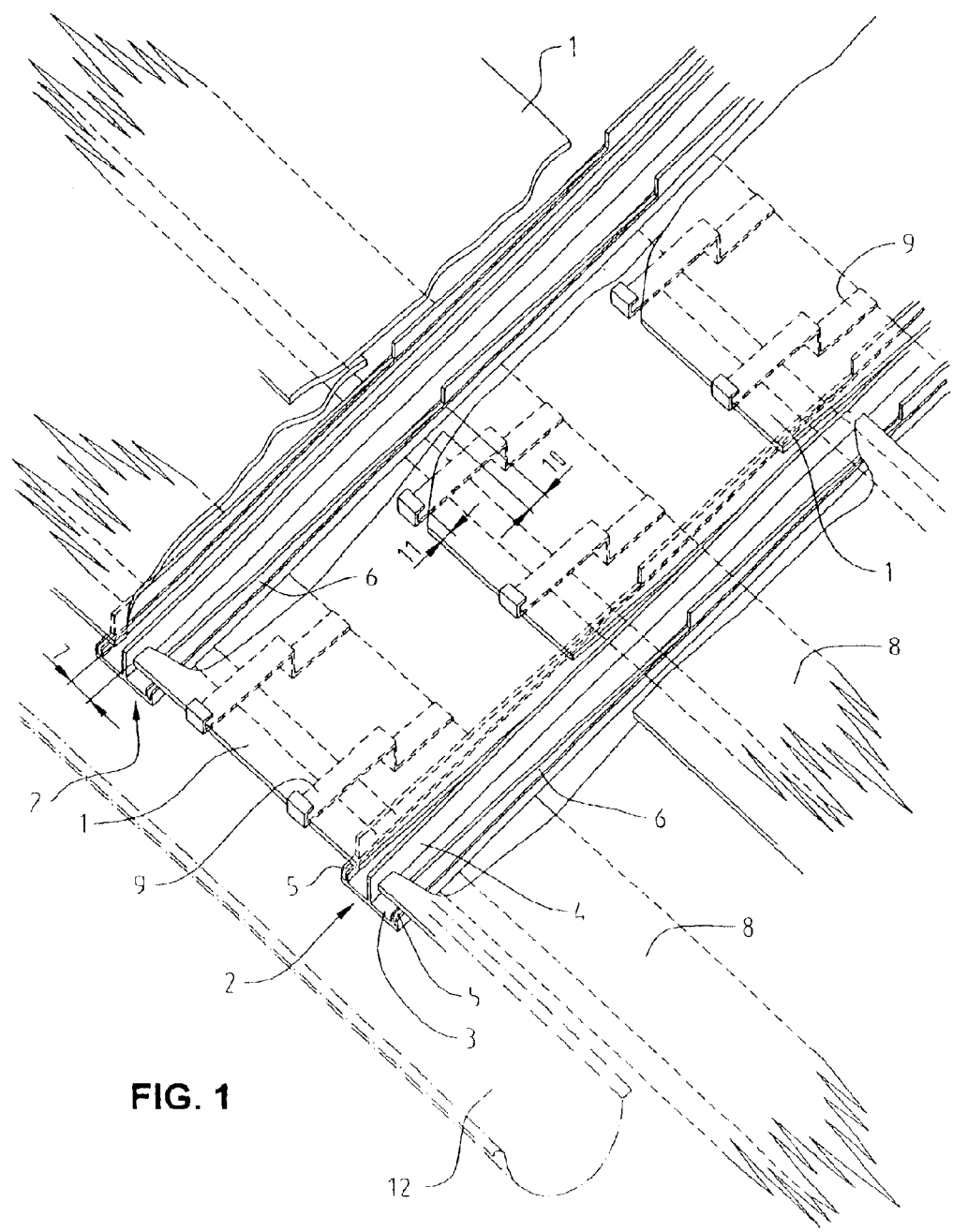
FIG. 1 is a perspective view of an embodiment of the invention.

The sole FIGURE in the drawing shows in a perspectival view from above a detail of a roof which is covered with flat panels 1. These panels can contain photovoltaic elements or can consist of such. The panels 1 overlap in vertical direction, i.e. are shingle-like, and are disposed in rows. In horizontal direction the panels are disposed next to one another with a minimal spacing 7. For the purpose of better visibility of the elements bearing the panels 1, marginal regions of the panels have been shown in the figure as cut off. In the region of their lateral edges, each panel 1 is supported by a section 2, which will be described more closely in the following.

The section 2 has a section floor 3, and is bounded on both sides by lateral crosspieces 5 projecting vertically upward, whereby an upwardly open channel is formed for draining water. The lateral crosspieces 5 in the present embodiment example each contain a groove running longitudinally in which a sawtooth-shaped insert 6 is received. The insert 6 can be fixed in the said groove through insertion, and secured against shifting through caulking or cementing in place, if necessary. A fixing of the insert with pins or screws is of course also possible. In addition, the section 2 has a middle crosspiece 4 projecting vertically upward from the middle of the section floor 3. The panels 1 are borne on the upper edges of the sawtooth-shaped inserts, and are supported in this way in the mentioned shingle-like configuration. The height of the "teeth" is adapted to the thickness of the panels 1, and is selected such that the panels 1 do not touch. Each panel 1 rises above the panel 1 lying below it by a piece, and thus also projects downwardly beyond the "tooth" supporting it. In the lowermost row, the supporting "tooth" can extend completely to the lower panel edge. Rainwater or water from melting snow draining laterally over the panel edges is received by the section 2, and preferably conducted into a gutter 12. The middle crosspiece 4 serves, on the one hand, to brace the section 2, and, on the other hand, it prevents the panels 1 from shifting laterally in an undesirable way and from touching adjacent panels 1. Furthermore the middle crosspiece 4 also acts as a labyrinth seal against blowing in of rainwater. The section 2 can be produced, for example, by pultrusion, and can be made out of a fiberglass-reinforced plastic. Of course the section can also be made out of metal, preferably aluminum, for instance through extruding. The sawtooth-shaped inserts 6 can be made of rubber, plastic, metal or other suitable material.

Alternatively, the section 2 can also be made out of sheet metal through bending. For this purpose, a sheet metal strip can be bent approximately W-shaped. Instead of the sawtooth-shaped inserts 6, the side walls of such a section can be incised and regionally bent so that each side wall has a saw-tooth-shaped contour.

The sections 2 in the example shown are borne on conventional roof battens 8. They are kept in the direction toward the gutter 12 by means of hooks 9 which are fastened to the roof battens 8. The hooks 9 can be made of plastic-coated metal, fiberglass-reinforced plastic or other suitable materials. The hooks 9 prevent the components from lying directly on top of one another.

As can be discerned from the FIGURE, the spacing of the roof battens 8 is selected such that each panel 1 with its upper edge protrudes over a roof batten 8. Achieved thereby is that the panel 1, when stressed, for instance when stepped upon, bends only until it is supported on the roof batten 8. Through this measure, large panels in particular can be protected against excessive bending or breakage.

The device described allows each individual panel 1 to be replaced without removing adjacent panels 1. The upper edge of each panel 1 is apart from the next "tooth" of the insert 6 by a spacing 10, the spacing 10 being greater than the length 11 of the shank of the hook 9. Thus, for removal, the panel 1 can be pushed upward until it can be lifted below out of the hook 9 and can then be pulled out downward.

Flat, panel-shaped components are referred to in a completely general way in the embodiment example described in the foregoing. In an especially preferred way, these components can be designed as photovoltaic elements. These can be mounted on conventional substructures with a few economical constructional parts, preferably on ventilated substructures in order to increase the effectiveness of the solar cells through as low temperatures as possible. Besides electricity generation, the components have the function of a weatherproof roof or facade cladding, likes tiles, slates, fiber cement shingles, ceramic tiles, etc. The described device according to the invention is suitable for use of the most various photovoltaic modules. Monocrystalline, polycrystalline, as well as thin film solar cells (amorphous, nanocrystalline, microcrystalline, CIS, etc.) of differing construction, size and color can be used.

The dimensions of the individual components can be selected as desired from some square decimeters to the size of several square meters. The components can thus be precisely adapted to the roof or facade dimensions, particular structural features and aesthetic points of view.

The device according to the invention moreover also permits differing superstructures of frameless but self-supporting photovoltaic modules as components, such as transparent and opaque glass/foil laminates, glass/glass-laminates, photovoltaic elements of cast resin and also frameless standard laminates. The described device can likewise contain components designed as solar thermal flat plate collectors. Furthermore components can be used which are designed as normal glass plates and blind plates, etc., for instance for realization of chimney passages, roof windows or for framing ventilation pipes.

The installation of the photovoltaic roof and facade system is simple and fast and therefore economical. Since no unusual substructures are necessary and only a few simple parts have to be installed on a conventional substructure, the installation can be carried out by instructed qualified personnel in conventional roof and facade construction. The subsequent removal and reinstallation of the individual components for repair purposes or for expansion of the facility is likewise very easy to carry out.

If the components contain photovoltaic modules or are designed as such, the interconnecting electrical wiring of the individual photovoltaic modules is preferably prepared simultaneously with the installation of the components. That calls for an electrical connection system with connector assemblies protected against contact, so that these tasks can also be carried out by the above-mentioned qualified personnel. The electrical collecting lines, electrical collector boxes, main lines, grounding conductors, etc. are usually installed beforehand by a qualified electrician.

Because the device according to the invention is conceived for conventional substructures, it can be combined as desired with other roof and facade coverings, such as e.g. tiles, slates, fiber cement shingles, ceramic tiles, etc.

What is claimed is:

1. An assembly for covering sloping roofs or facades comprising:
    (a) a plurality of adjacently situated rows of flat panel components disposed under and overlapping one another;
    (b) a respective section in an area between each adjacently situated row forming an upwardly open channel for receipt and drainage of water, said section comprising a plurality of longitudinal grooves and a plurality of sawtooth-shaped lateral parts received in said longitudinal grooves supporting the flat panel components.

2. The assembly according to claim 1, wherein the section has a crosspiece projecting upward from a section floor.

3. The assembly according to claim 2, wherein the sawtooth-shaped lateral parts are made of rubber or plastic.

4. The assembly according to one of the claims 2 and 3, wherein the section is made of reinforced plastic and is produced through pultrusion.

5. The assembly according to claim 2, wherein the section is made from sheet metal and is produced by folding.

6. The assembly according to claim 5, wherein the section and its lateral parts are made of one piece.

7. The assembly according to one of the claims 1, 2, and 3, wherein at least part of the components comprise photovoltaic elements.

8. The assembly according to one of the claims 1, 2 and 3, wherein the section is continuously water-carrying over the entire height of the assembly.

9. The assembly according to one of the claims 1, 2 and 3, further comprising:
    (a) a plurality of supports extending at least approximately orthogonally to the sections, said sections being borne by said supports; and
    (b) a plurality of hooks, each hook having a first end attached to a respective one of the supports and a second end comprising a lower edge of a respective one of the components.

* * * * *

UNITED STATES PATENT AND TRADEMARK OFFICE
CERTIFICATE OF CORRECTION

PATENT NO. : 6,877,287 B2  
DATED : April 12, 2005  
INVENTOR(S) : Szacsvay

It is certified that error appears in the above-identified patent and that said Letters Patent is hereby corrected as shown below:

<u>Column 4,</u>  
Line 45, please change "claims 2 and 3" to correctly read: -- claims 1, 2 and 3 --.

Signed and Sealed this

Seventh Day of June, 2005

JON W. DUDAS  
*Director of the United States Patent and Trademark Office*